United States Patent Office 3,181,308
Patented May 4, 1965

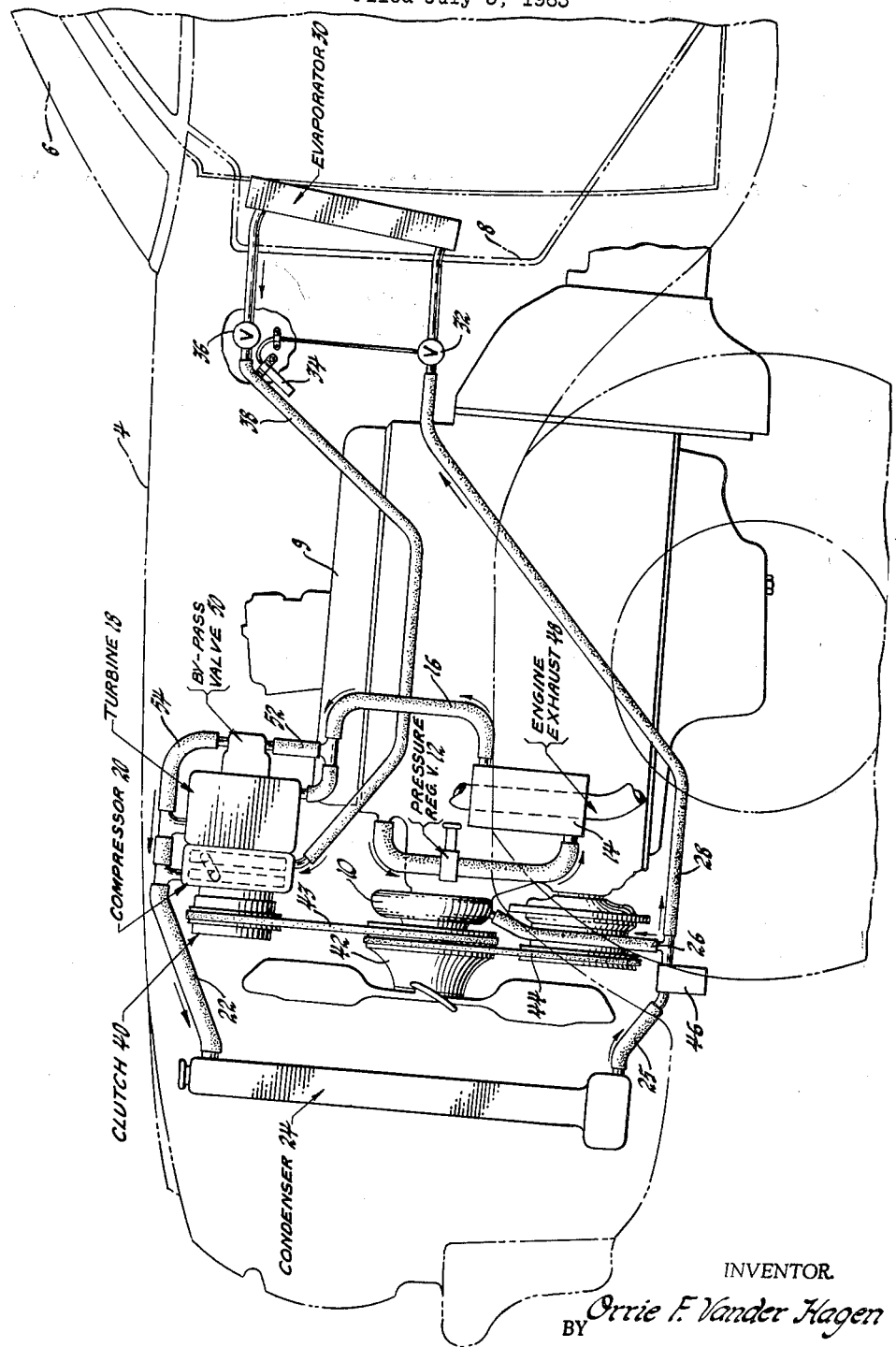

3,181,308
REFRIGERANT ENGINE COOLING AND
AUXILIARY POWER SYSTEM
Orrie F. Vander Hagen, Lake Orion, Mich., assignor to General Motors Corporation, Detroit, Mich., a corporation of Delaware
Filed July 5, 1963, Ser. No. 292,851
2 Claims. (Cl. 62—238)

This invention relates to a combined engine cooling and refrigeration system utilizing a common working fluid.

If an internal combustion engine confined fluid cooling system and a refrigeration system were combined for operation although having divergent purposes, particularly but not necessarily in the automotive field, in such a way as to use the same working fluid—i.e.—the refrigerant—simplicity and numerous other advantages are obtainable which have not heretofore been available.

An object of the present invention is to provide a combination of an engine cooling system and an auxiliary refrigeration system in one operative system which is simple in construction, low in cost of construction and maintenance, and effective under widely divergent weather conditions.

A feature of the invention is a closed engine cooling and auxiliary refrigerating system in which one fluid functions as the working fluid. Another feature is a closed engine cooling and auxiliary refrigerating system having a compressor drive turbine driven by waste heat of an internal combustion engine, the compressor and turbine being operated with the engine coolant and the latter also serving as a refrigerant. Another feature is a closed system of engine cooling and auxiliary refrigeration in which a condenser serves the customary functions of a combination of an engine radiator and a refrigeration system condenser.

These and other important features of the invention will now be described in detail in the specification and then pointed out more particularly in the appended claims.

The drawing shows a phantom view, in dot and dash lines, of the forward part of an automobile including a hood 4, a windshield 6, and a firewall 8 separating the engine and passenger compartments. A conventional internal combustion engine is shown in full lines at 9 as being located forward of the firewall 8.

At the front of the liquid cooled engine 9 is installed a high pressure pump 10 which is capable of handling an engine coolant which coolant is a volatile refrigerant suitable to serve in an air conditioning system. The coolant outlet from the engine jacket constitutes a duct having a pressure regulating valve 12 therein, an accumulator or engine exhaust heat exchanger 14 and a conduit 16 for super heated refrigerant gas. The conduit 16 extends to the inlet of a turbine 18 arranged to drive a two stage compressor 20. The discharge from the turbine 18 is by way of an exhaust line 22 leading to the top of a condenser 24 mounted at the front of the vehicle. The bottom outlet or discharge end of the condenser 24 is connected by conduits 25 and 26 back to the inlet of the pump 10 and also by a conduit 28 leading to an evaporator 30 mounted within the passenger compartment and to the rear of the firewall 8. A conventional expansion valve 32 with a conventional bulb 34 is utilized for operating or regulating flow to the inlet of the evaporator 30 and the discharge from the latter is by way of a suction throttling valve 36 in a conduit 38 leading to the inlet of the compressor 20. The suction throttling valve 36 is of no moment insofar as the present invention is concerned but may be of the type of valve as is disclosed in the United States patent application S.N. 228,464, filed October 4, 1962, in the names of M. W. Baker and L. E. Waite. A clutch 40 is arranged optionally to drive the compressor 20 when conditions are such that the turbine 18 is not adequate for the purpose. The clutch is preferably magnetically energized and is driven and may be actuated by a belt 43 which in turn is actuated by engine running parts such as the fan arrangement 42 and a second belt 44 operated from the engine crankshaft. A filter or reserve supply unit 46 is utilized to receive refrigerant from the condenser 24 before it is passed on either to the pump 10 or to the evaporator 30. The engine exhaust pipe 48 extends through the heat exchanger 14 in such a way as to be adapted to give up its heat by conduction to refrigerant passing from the jacket of the engine to the turbine 18. A bypass valve 50 is connected by means of conduits 52 and 54 so that refrigerant may pass around the turbine and to the conduit 22 when and if pressure becomes too high in the conduit 16 or if power supplied to the compressor 20 tends to become more than adequate.

In the operation of the above arrangement, the cooling system of the engine 9 is initially filled about two-thirds full of a volatile refrigerant. When the engine 9 is started, the refrigerant temperature in the engine jacket will rise until the pressure regulating valve 12 opens at a predetermined setting. Upon opening, liquid and gas refrigerant will flow into the heat exchanger 14 and extracts heat through the metal walls of the exchanger from the engine exhaust gas. This will cause vaporization of any liquid refrigerant present in the heat exchanger and the super heated gas from the refrigerant in the line 16 is available for use to operate the turbine 18. The engine fan arrangement 42 will keep the condenser 24 at a suitable temperature such as 150°. This will cause the pressure in the condenser 24, in a given situation, to be about 10 p.s.i.g. This would result in 30 p.s.i.g. pressure differential, in that particular situation, with which to operate the turbine 18.

If the engine is in an automobile as shown in the drawing, the amount of engine coolant boiled in the exchanger 14 conceivably would not be sufficient at vehicle speeds below 20 miles per hour to drive the turbine 18 and hence the compressor 20, so the system is arranged in such a way that if the pressure of the coolant in line 16 is not high enough, the clutch 40 may be caused to engage and the compressor will be driven from the running parts of the engine 9. Details regarding the connections, controls, and construction of the clutch 40, the compressor 20, and the turbine 18 are not given herein as they are subject to wide fluctuation as to design and they form no part of the present invention.

In utilizing a common fluid for engine cooling and the auxiliary refrigeration system, the following advantages are derived: (1) a low cost constant speed drive for the compressor 20 may be maintained because of the action of the bypass valve 50, (2) a conventional radiator need not be used as the condenser 24 serves a dual purpose, (3) no antifreeze is needed for the engine, (4) no penalty in gas mileage is paid for air conditioning as waste heat from the engine coolant and exhaust is utilized, (5) a simple low cost compressor is suitable, (6) a factory sealed coolant system is fully closed and the refrigerant need not be changed as it is sealed in, (7) a low pressure is easily established in the refrigeration circuit, (8) the engine warmup time is only one-half as long as a system using water as an engine coolant.

I claim:

1. Combined engine cooling and refrigeration systems enclosing a common refrigerant fluid, said engine cooling system including a pump, an engine jacket, pressure regulating valve, engine exhaust heat exchanger, an auxiliary power unit and a condenser connected in a closed circuit and in that order, said refrigeration system including an evaporator for effecting air conditioning, a compressor arranged to be driven by said auxiliary power unit, said condenser, and an expansion valve connected in that order to form a closed circuit, and said systems being supplemented by a bypass valve connecting said heat exchanger to said condenser around said auxiliary power unit.

2. Combined engine cooling and refrigeration systems as set forth in claim 1, an engine fan and a clutch arranged to be driven with said pump, said fan being adapted to cool said condenser, and said clutch being adapted to drive said compressor.

References Cited by the Examiner
UNITED STATES PATENTS

| | | | |
|---|---|---|---|
| 2,725,044 | 11/55 | Doyle | 123—41.19 |
| 2,991,632 | 7/61 | Rogers | 62—238 X |
| 3,070,975 | 1/63 | Cornelius | 62—244 X |

ROBERT A. O'LEARY, *Primary Examiner.*